US012476756B2

(12) United States Patent
Manolakos et al.

(10) Patent No.: US 12,476,756 B2
(45) Date of Patent: Nov. 18, 2025

(54) SRS TRANSMISSION DELAY SHIFT REPORTING

(71) Applicant: QUALCOMM Incorporated, San Diego, CA (US)

(72) Inventors: Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 17/919,229

(22) PCT Filed: May 19, 2021

(86) PCT No.: PCT/US2021/033261
§ 371 (c)(1),
(2) Date: Oct. 14, 2022

(87) PCT Pub. No.: WO2021/236842
PCT Pub. Date: Nov. 25, 2021

(65) Prior Publication Data
US 2023/0171055 A1  Jun. 1, 2023

(30) Foreign Application Priority Data
May 22, 2020 (GR) .............................. 20200100273

(51) Int. Cl.
*H04L 5/00* (2006.01)
*H04B 7/06* (2006.01)

(52) U.S. Cl.
CPC ......... *H04L 5/0048* (2013.01); *H04B 7/0671* (2013.01); *H04L 5/0082* (2013.01); *H04L 5/0092* (2013.01)

(58) Field of Classification Search
CPC ... H04L 5/0048; H04L 5/0082; H04L 5/0092; H04B 7/0671
See application file for complete search history.

(56) References Cited

U.S. PATENT DOCUMENTS

2020/0099490 A1* 3/2020 Sridharan ............. H04L 5/0007
2020/0178280 A1* 6/2020 Guan ................... H04B 7/0626

FOREIGN PATENT DOCUMENTS

CN  109076576 A  12/2018
JP  2011525079 A   9/2011
(Continued)

OTHER PUBLICATIONS

Fraunhofer Iis., et al., "Discussion on Staggered SRS for NR Positioning", 3GPP TSG RAN WG1 #101-e, R1-2004515, e-Meeting, May 25, 2020-Jun. 5, 2020, May 15, 2020, 14 page.
(Continued)

*Primary Examiner* — Jamal Javaid
(74) *Attorney, Agent, or Firm* — Sunstein LLP/QUALCOMM Incorporated

(57) ABSTRACT

A method of sending sounding reference signals includes: reporting delay shift information from a user equipment to a network entity, the delay shift information indicative of a second sounding reference signal having a delay shift relative to a first sounding reference signal; sending the first sounding reference signal from a first antenna of a plurality of antennas of the user equipment to the network entity; and sending the second sounding reference signal from a second antenna of the plurality of antennas of the user equipment to the network entity with the delay shift relative to the first sounding reference signal.

42 Claims, 9 Drawing Sheets

(56) References Cited

FOREIGN PATENT DOCUMENTS

JP          2012506193 A    3/2012
WO          2007142233 A1   12/2007

OTHER PUBLICATIONS

Huawei, et al., "SRS Design for NR Positioning," 3GPP TSG RAN WG1 Meeting #98bis, R1-1910034, Oct. 14, 2019-Oct. 20, 2019, Oct. 5, 2019, 20 pages, The whole document.

Fraunhofer Iis, et al., "Discussion on Staggered SRS for NR Positioning", 3GPP TSG RAN WG1 Meeting #101-e, R1-2004515, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, May 15, 2020, 13 Pages, XP051886237, figure 5, tables 1, 2, sections 1, 2, 3.1, Annexes B, C.

Nokia, et al., "Corrections on Cross-carrier Scheduling with Different Numerologies", 3GPP TSG-RAN WG1 Meeting #100b-e, R1-2003145, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020, May 11, 2020, 7 Pages, XP051882966, sections 5.1.2.1, 6.2.1.

Ericsson: "Maintenance for Multi-antenna Scheme," 3GPP TSG-RAN WG1 Meeting #94, Tdoc R1-1809195, Goteborg, Sweden, Aug. 20-24, 2018 (Aug. 24, 2018), 12 pages, XP051516565, Retrieved from the Internet: URL: http://www.3gpp.org/ftp/tsg%5Fran/WG1%5FRL1/TSGR1%5F94/Docs/R1%2D1809195%2Ezip. [Retrieved on Aug. 11, 2018] Sections 2.1.1, 2.2.1, 2.3.1. section 2.3.4.

Huawei, et al., "Remaining Issues on SRS for NR Positioning", 3GPP Draft, 3GPP TSG RAN WG1 Meeting #99, R1-1911897, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 Nov. 9, 2019), XP051823079, 14 Pages, Sections 2.5, 3.

International Search Report and Written Opinion—PCT/US2021/033261—ISA/EPO—Nov. 25, 2021.

Nokia, et al., "Remaining Issues on UL Non-Codebook Based Transmission", 3GPP TSG-RAN WG1 Meeting #92bis, R1-1805102, (UL MIMO Non-Codebook V2), 3rd Generation Partnership Project, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 16, 2018, XP051427520, 4 Pages.

Ericsson: "Maintenance for Multi-antenna Scheme", 3GPP TSG-RAN WG1 Meeting #94, R1-1809195, Goteborg, Sweden, Aug. 20-24, 2018, pp. 1-12.

Taiwan Search Report—TW110118301—TIPO—Dec. 15, 2024.

\* cited by examiner

SRS TRANSMISSION DELAY SHIFT REPORTING

CROSS-REFERENCE TO RELATED APPLICATIONS

This application is the National Stage of International Application No. PCT/US2021/033261, filed May 19, 2021, entitled "SRS TRANSMISSION DELAY SHIFT REPORTING," which claims the benefit of Greek patent application No. 20200100273, filed May 22, 2020, entitled "SRS TRANSMISSION DELAY SHIFT REPORTING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax), fifth-generation (5G), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment configured for wireless communication includes: a transceiver including a plurality of antennas; a memory; and a processor communicatively coupled to the transceiver and the memory and configured to: send, to a network entity, a first sounding reference signal via a first antenna of the plurality of antennas; send, to the network entity, a second sounding reference signal via a second antenna of the plurality of antennas, with the second sounding reference signal having a delay shift relative to the first sounding reference signal; and send, via the transceiver to the network entity, delay shift information indicative of the second sounding reference signal having the delay shift relative to the first sounding reference signal.

Implementations of such a user equipment may include one or more of the following features. The delay shift information indicates that the second sounding reference signal has a non-zero delay shift relative to the first sounding reference signal. To send the delay shift information the processor is configured to send a delay shift value indicating an amount of the delay shift of the second sounding reference signal relative to the first sounding reference signal. The delay shift value indicates a maximum delay shift of the second sounding reference signal relative to the first sounding reference signal. The processor is further configured to determine the delay shift value based on a subcarrier spacing of the first sounding reference signal and the second sounding reference signal. The processor is further configured to determine the delay shift value as a multiple of a step size, and: step $$\text{size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

Also or alternatively, implementations of such a user equipment may include one or more of the following features. The processor is further configured to send the delay shift information in response to receiving a configuration message, via the transceiver, instructing the user equipment to operate in a codebook-based, full-power transmission mode. The processor is further configured to send the delay shift information at least one of to a server using LPP (Long Term Evolution Positioning Protocol) signaling or to a base station using RRC (Radio Resource Control) signaling. The processor is further configured to send the delay shift information in at least one of a MAC-CE (medium access control-control element) command or in a positioning report. The processor is further configured to send the delay shift information in the MAC-CE command, and the delay shift information includes a delay shift value for a sounding reference signal resource set or a sounding reference signal resource.

Also or alternatively, implementations of such a user equipment may include one or more of the following features. The processor is configured to send the first sounding reference signal and the second sounding reference signal with the delay shift being no larger than a duration of a first cyclic prefix of the first sounding reference signal or a second cyclic prefix of the second sounding reference signal. The first sounding reference signal and the second sounding reference signal have the same content. The delay shift information includes a timing correction, a timing offset, a cyclic-shift delay, or any combination thereof, and the first sounding reference signal and the second sounding reference signal are both a sounding reference signal resource for positioning, a sounding reference signal resource set for positioning, or a sounding reference signal for communication.

In another embodiment, a user equipment includes: means for sending a first sounding reference signal via a first antenna of the plurality of antennas to a network entity; means for sending a second sounding reference signal via a second antenna of the plurality of antennas to the network entity with a delay shift relative to the first sounding reference signal; and means for reporting delay shift information to the network entity, the delay shift information being indicative of the second sounding reference signal having the delay shift relative to the first sounding reference signal.

Implementations of such a user equipment may include one or more of the following features. The delay shift information indicates that the second sounding reference signal has a non-zero delay shift relative to the first sounding reference signal. The means for reporting the delay shift information include means for reporting a delay shift value indicating an amount of the delay shift of the second sounding reference signal relative to the first sounding reference signal. The delay shift value indicates a maximum delay shift of the second sounding reference signal relative to the first sounding reference signal. The user equipment includes means for determining the delay shift value based on a subcarrier spacing of the first sounding reference signal and the second sounding reference signal. The user equipment includes means for determining the delay shift value as a multiple of a step size, and: step $$\text{size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

Also or alternatively, implementations of such a user equipment may include one or more of the following features. The means for reporting the delay shift information include means for reporting the delay shift information in response to receiving a configuration message instructing the user equipment to operate in a codebook-based, full-power transmission mode. The means for reporting the delay shift information include means for reporting the delay shift information at least one of to a server using LPP (Long Term Evolution Positioning Protocol) signaling or to a base station using RRC (Radio Resource Control) signaling. The means for reporting the delay shift information include means for reporting the delay shift information in at least one of a MAC-CE (medium access control-control element) command or in a positioning report. The means for reporting the delay shift information include means for reporting the delay shift information in the MAC-CE command, and the delay shift information includes a delay shift value for a sounding reference signal resource set or a sounding reference signal resource.

Also or alternatively, implementations of such a user equipment may include one or more of the following features. The means for sending the first sounding reference signal and the means for sending the second sounding reference signal include means for sending the first sounding reference signal and the second sounding reference signal such that the delay shift is no larger than a duration of a first cyclic prefix of the first sounding reference signal or a second cyclic prefix of the second sounding reference signal. The first sounding reference signal and the second sounding reference signal have the same content.

In another embodiment, a method of sending sounding reference signals includes: reporting delay shift information from a user equipment to a network entity, the delay shift information indicative of a second sounding reference signal having a delay shift relative to a first sounding reference signal; sending the first sounding reference signal from a first antenna of a plurality of antennas of the user equipment to the network entity; and sending the second sounding reference signal from a second antenna of the plurality of antennas of the user equipment to the network entity with the delay shift relative to the first sounding reference signal.

Implementations of such a method may include one or more of the following features. The delay shift information indicates that the second sounding reference signal has a non-zero delay shift relative to the first sounding reference signal. Reporting the delay shift information includes reporting a delay shift value indicating an amount of the delay shift of the second sounding reference signal relative to the first sounding reference signal. The delay shift value indicates a maximum delay shift of the second sounding reference signal relative to the first sounding reference signal. The method includes determining the delay shift value based on a subcarrier spacing of the first sounding reference signal and the second sounding reference signal. The method includes determining the delay shift value as a multiple of a step size, and: step $$\text{size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

Also or alternatively, implementations of such a method may include one or more of the following features. The method includes receiving, at the user equipment, a configuration message instructing the user equipment to operate in a codebook-based, full-power transmission mode, the delay shift information is reported in response to receiving the configuration message. The delay shift information is reported to at least one of a server using LPP (Long Term Evolution Positioning Protocol) signaling or a base station using RRC (Radio Resource Control) signaling. The delay shift information is reported in at least one of a MAC-CE (medium access control-control element) command or in a positioning report. The delay shift information is reported in the MAC-CE command, and the delay shift information includes a delay shift value for a sounding reference signal resource set or a sounding reference signal resource.

Also or alternatively, implementations of such a method may include one or more of the following features. The first sounding reference signal and the second sounding reference signal are sent such that the delay shift is no larger than a duration of a first cyclic prefix of the first sounding reference signal or a second cyclic prefix of the second sounding reference signal. The first sounding reference signal and the second sounding reference signal have the same content. The delay shift information includes a timing correction, a timing offset, a cyclic-shift delay, or any combination thereof, and the first sounding reference signal and the second sounding reference signal are both a sounding reference signal resource for positioning, a sounding reference signal resource set for positioning, or a sounding reference signal for communication.

In another embodiment, a non-transitory, processor-readable storage medium includes processor-readable instructions to cause a processor of a user equipment to: send, to a network entity, a first sounding reference signal via a first antenna of a plurality of antennas of the user equipment; send, to the network entity, a second sounding reference signal via a second antenna of the plurality of antennas of the user equipment, with the second sounding reference signal having a delay shift relative to the first sounding reference signal; and send, to the network entity, delay shift information indicative of the second sounding reference signal having the delay shift relative to the first sounding reference signal.

Implementations of such a storage medium may include one or more of the following features. The delay shift information indicates that the second sounding reference signal has a non-zero delay shift relative to the first sounding reference signal. The processor-readable instructions to cause the processor to send the delay shift information include processor-readable instructions to cause the processor to send a delay shift value indicating an amount of the delay shift of the second sounding reference signal relative to the first sounding reference signal. The delay shift value indicates a maximum delay shift of the second sounding reference signal relative to the first sounding reference signal. The storage medium includes processor-readable instructions to cause the processor to determine the delay shift value based on a subcarrier spacing of the first sounding reference signal and the second sounding reference signal. The storage medium includes processor-readable instructions to cause the processor to determine the delay shift value as a multiple of a step size, and: step $$\text{size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

Also or alternatively, implementations of such a storage medium may include one or more of the following features. The processor-readable instructions to cause the processor to send the delay shift information include processor-readable instructions to cause the processor to send the delay shift information in response to the user equipment receiving a configuration message instructing the user equipment to operate in a codebook-based, full-power transmission mode. The processor-readable instructions to cause the processor to send the delay shift information include processor-readable instructions to cause the processor to send the delay shift information at least one of to a server using LPP (Long Term Evolution Positioning Protocol) signaling or to a base station using RRC (Radio Resource Control) signaling. The processor-readable instructions to cause the processor to send the delay shift information include processor-readable instructions to cause the processor to send the delay shift information in at least one of a MAC-CE (medium access control-control element) command or in a positioning report. The processor-readable instructions to cause the processor to send the delay shift information include processor-readable instructions to cause the processor to send the delay shift information in the MAC-CE command, and the delay shift information includes a delay shift value for a sounding reference signal resource set or a sounding reference signal resource.

Also or alternatively, implementations of such a storage medium may include one or more of the following features. The processor-readable instructions to cause the processor to send the first sounding reference signal and the second sounding reference signal include processor-readable instructions to cause the processor to send the first sounding reference signal and the second sounding reference signal with the delay shift being no larger than a duration of a first cyclic prefix of the first sounding reference signal or a second cyclic prefix of the second sounding reference signal. The processor-readable instructions to cause the processor to send the first sounding reference signal and the second sounding reference signal include processor-readable instructions to cause the processor to send the first sounding reference signal and the second sounding reference signal with the same content.

DETAILED DESCRIPTION

Figure 1:
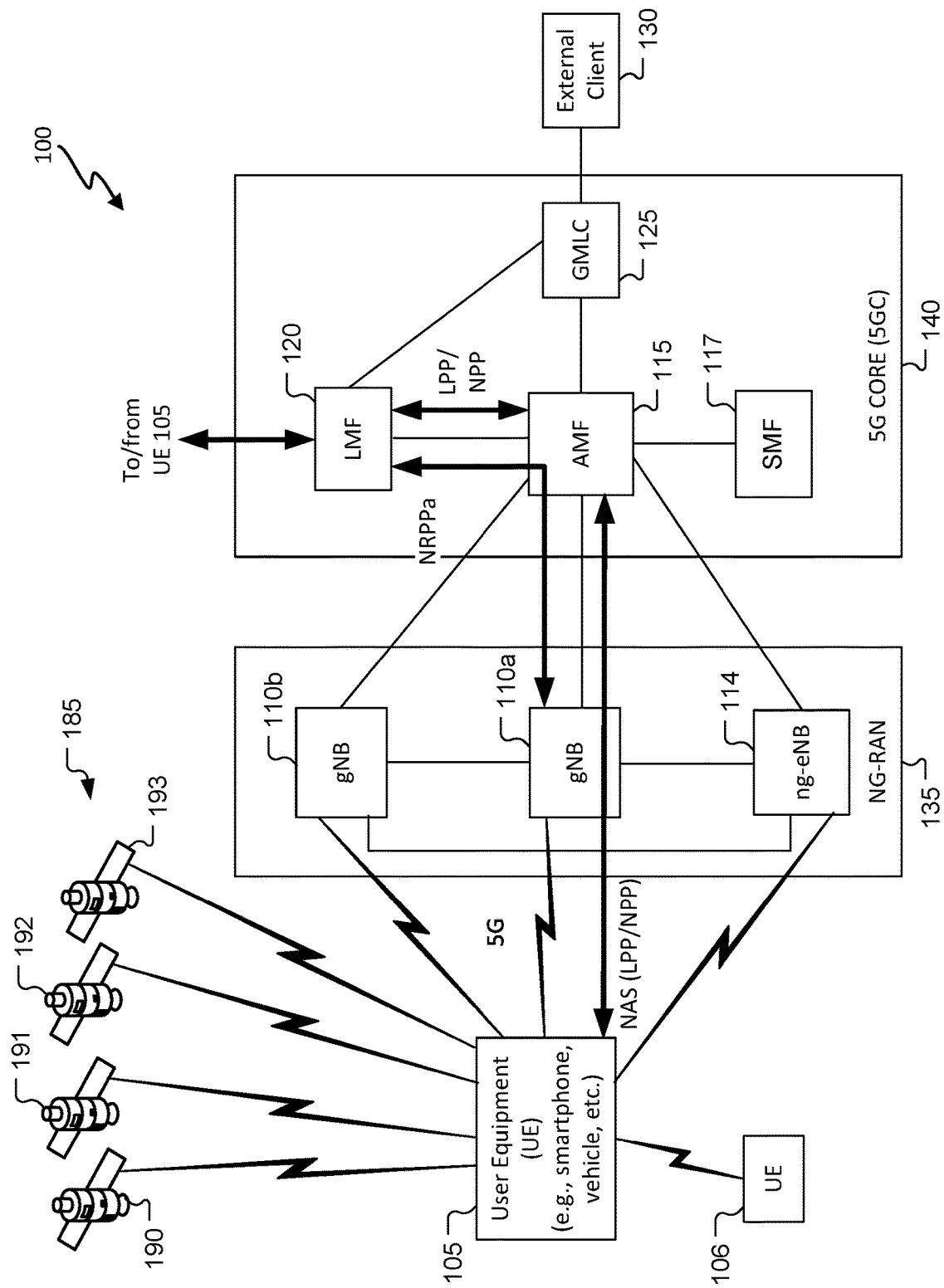
FIG. 1 is a simplified diagram of an example wireless communications system.

Techniques are discussed herein for reporting sounding reference signal delay shift. A UE may send sounding reference signals with relative delay shift. The delay shift provides transmit diversity which may help an entity that receives the sounding reference signals to decode the signals. The UE may report to a network entity, such as a base station or server, that there is a delay shift between sounding reference signals. The network entity may use the knowledge that there is delay shift to help process the sounding reference signals for use in determining a position of the UE. The UE may report an amount of the delay shift, and the network entity may use this information to help process the received signals for determining the position of the UE. These are examples, and other examples may be implemented.

Items and/or techniques described herein may provide one or more of the following capabilities, as well as other capabilities not mentioned. Position determination based on signals transmitted with transmit diversity may be improved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110*a*, 110*b*, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
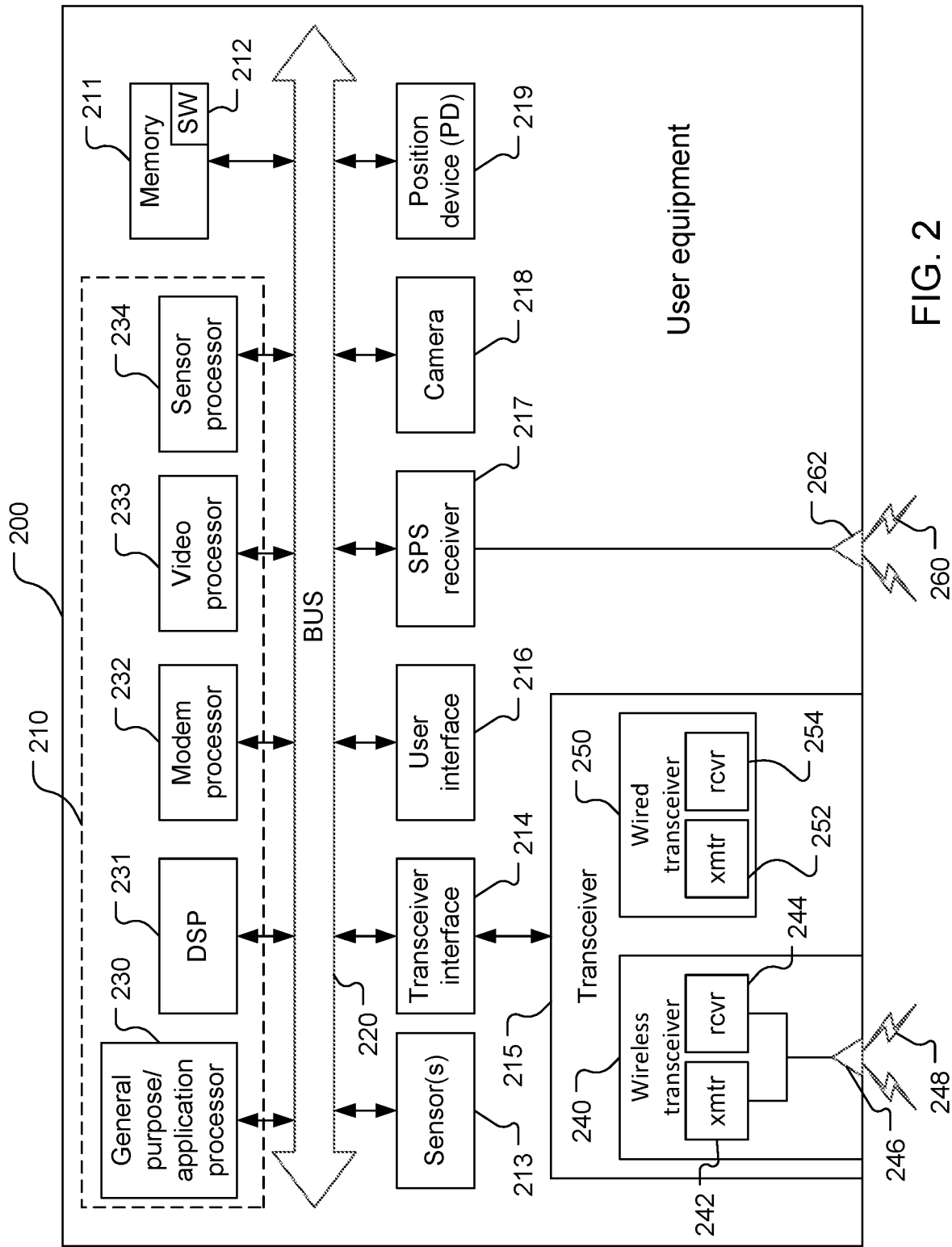
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
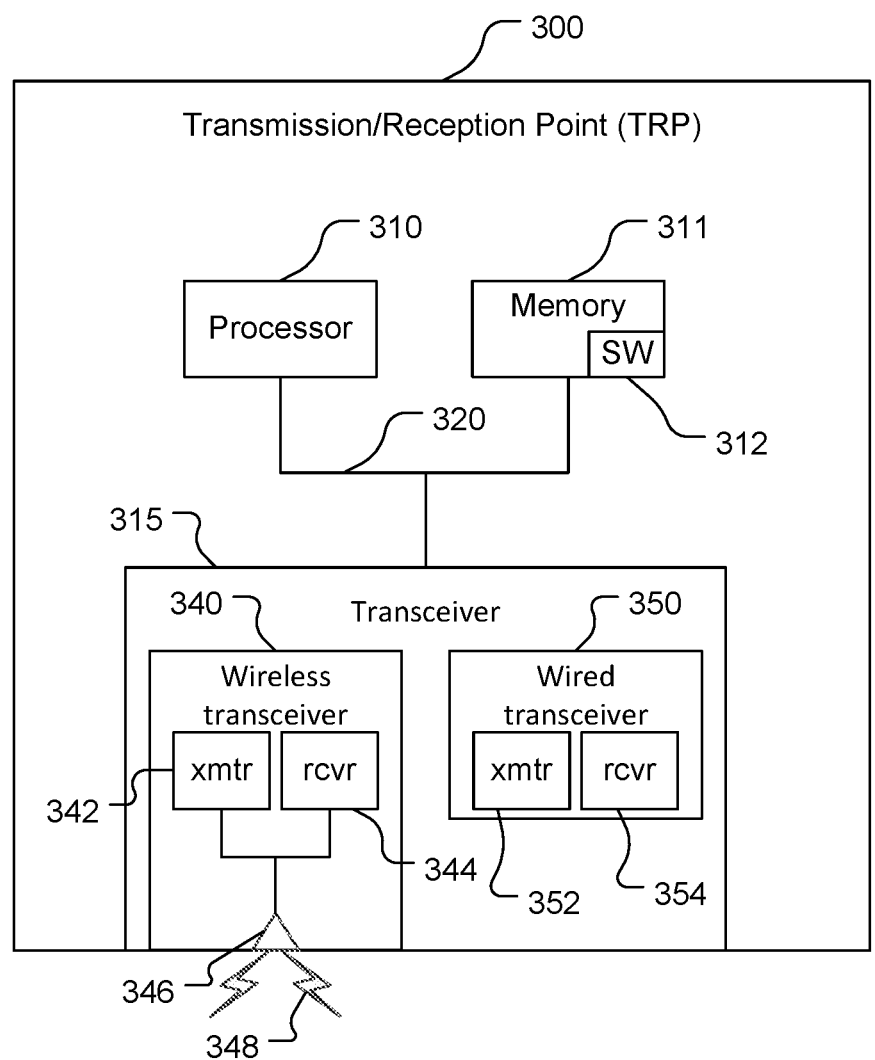
FIG. 3 is a block diagram of components of an example transmission/reception point.

Referring also to FIG. 3, an example of a TRP 300 of the BSs 110*a*, 110*b*, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities.

The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
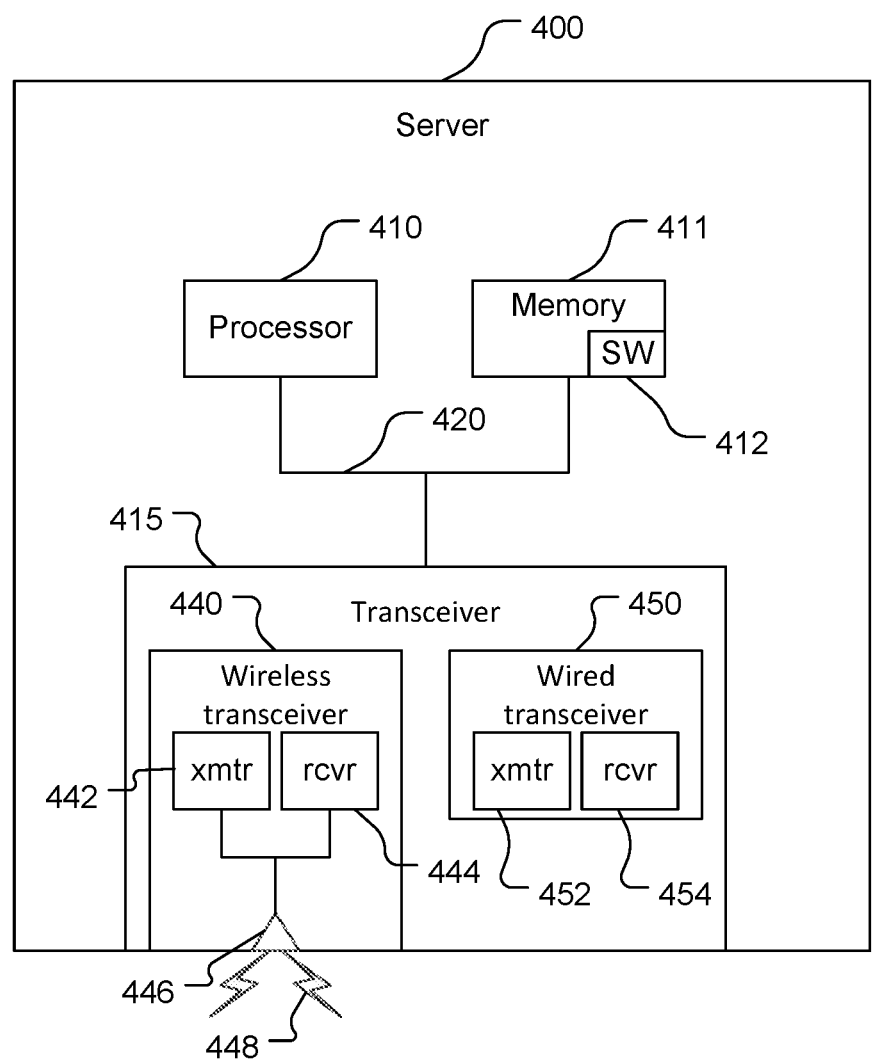
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Multi-Antenna Transmission

Uplink and/or downlink signals may be transmitted and/or received by multiple antennas. For example, the same signal (e.g., same content, same frequency, same resources) may be transmitted from multiple antennas. The antennas may have transmit diversity such as spatial diversity and/or delay diversity. Transmit diversity may help a receiver decode the signal, e.g., because two versions of the signal are received which may experience different channel conditions and thus may help improve the ability of the receiver to accurately and quickly decode the signal. The transmit diversity provides multi-path transmission which may help in reception/decoding but may hinder position determination due to fading.

Figure 5:
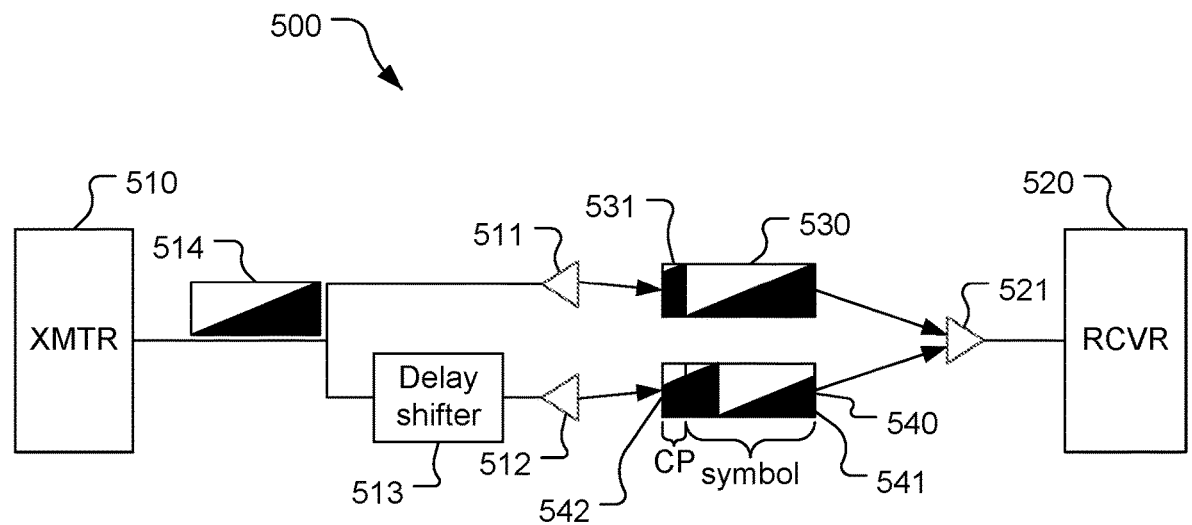
FIG. 5 is a schematic illustration of transmitting signals with a relative delay shift.

Cyclic delay diversity (CDD), e.g., small delay CDD (S-CDD), is a type of transmit diversity. The CDD type of transmit diversity may be implemented by applying a different phase delay (cyclic phase delay) for each OFDM subcarrier. CDD transmit diversity may be used in spatial multiplexing to increase diversity between two spatial paths. For example, referring to FIG. 5, a CDD system 500 includes a transmitter (XMTR) 510, a receiver (RCVR) 520, transmit antennas 511, 512, a receive antenna 521, and a delay shifter 513. The antennas 511, 512 are shown separately from the transmitter 510 and the antenna 521 is shown separately from the receiver 520, but the antennas 511, 512, 521 may be considered as portions of the transmitter 510 and the receiver 520, respectively. In the system 500, the transmitter 510 sends a symbol 514 of a signal to the antenna 511 without a delay shift, and sends the symbol 514 to the delay shifter 513 that introduces a delay shift to the symbol 514 and provides a corresponding delay-shifted symbol to the antenna 512. The symbol 514 is shown with half the symbol shaded to help illustrate the delay shifting introduced by the delay shifter 513. The antenna 511 sends a signal 530 that includes the symbol 514 and a cyclic prefix 531. The antenna 512 sends a signal 540 that includes a delay-shifted symbol 541 and a cyclic prefix 542. The antenna 511 transmits an original version of the data, i.e., the symbol 514, and the antenna 512 transmits a cyclic-shifted version of the original data.

Figure 6:
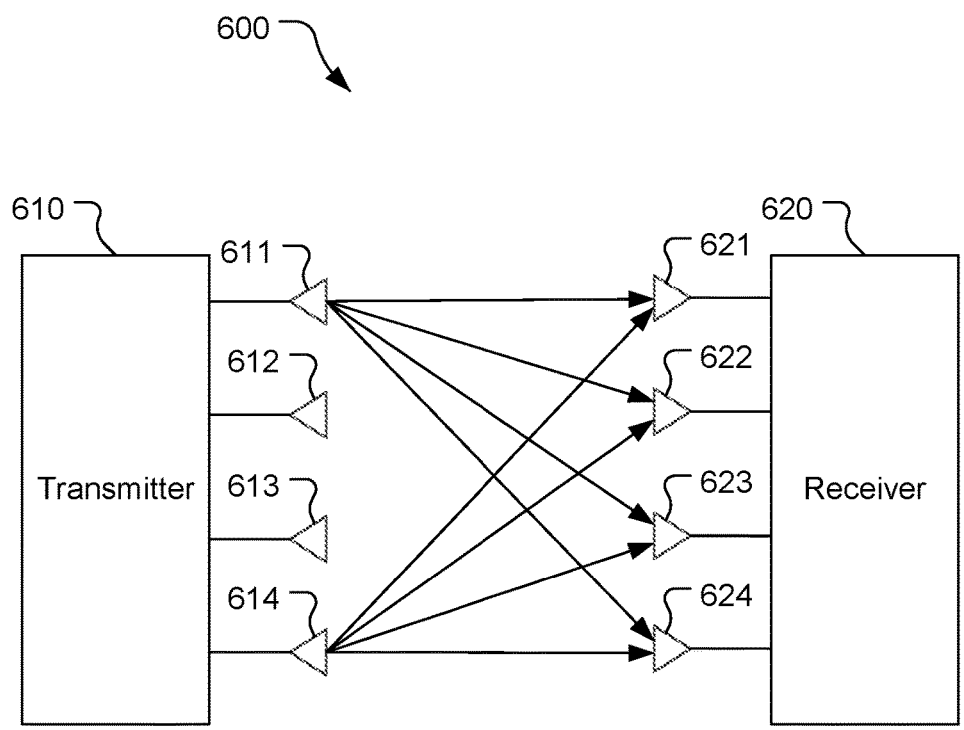
FIG. 6 is a block diagram of a multiple-input, multiple-output system.

While the system 500 includes two transmit antennas and one receive antenna, other systems may be used with multiple transmit antennas and multiple receive antennas. For example, referring also to FIG. 6, a multiple-input, multiple-output (MIMO) system 600 includes a transmitter 610, a receiver 620, transmit antennas 611, 612, 613, 614, and receive antennas 621, 622, 623, 624. Each of the transmit antennas 611-614 sends a respective signal that may be received by each of the receive antennas 621-624, although only signals from the transmit antennas 611, 614 are indicated in FIG. 6 to help reduce the complexity of the figure. Different data streams (e.g., different content, i.e., different logical sequences of modulated (e.g., QPSK (quadrature phase-shift keying)) information) may be transmitted by different ones of the antennas 611-614. In the system 600, there are four transmit antennas 611-614 and four receive antennas 621-624, but other quantities of transmit antennas and/or receive antennas may be used. Also, the transmitter 610 may be a transceiver and include receive capabilities and the receiver 620 may be a transceiver and include transmit capabilities.

The number of data streams (ports or layers) corresponds to a rank of the transmission. For example, if four different data streams were sent by the transmitter 610 over the transmit antennas 611-614, then the rank would be four (4), i.e., rank 4 or full rank. If two different data streams were each sent over a pair of the transmit antennas 611-614, then this would be rank 2, and if one data stream were sent over all four of the transmit antennas 611-614, then this would be rank 1. A rank that is lower than the number of transmit antennas is called a non-full rank and the corresponding transmission mode is called a non-full-rank transmission mode. In general, the rank of the MIMO system 600 is limited by the number of transmit or receive antennas, whichever is lower. In addition, channel conditions at the transmitter 610, as well as other considerations, such as available resources at the receiver 620, may also affect the transmission rank. For example, the rank (and therefore, the number of data streams) assigned to a particular UE on the downlink may be determined based on a rank indicator (RI) transmitted from the UE to the base station. The RI may be determined based on the antenna configuration (e.g., the number of transmit and receive antennas) and a measured signal-to-interference-plus-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Release 15 of 3GPP, in MIMO mode, a UE with more than one SRS port could not transmit with full power (i.e., the maximum power for which the UE is rated) with non-coherent/partially-coherent (non-full-rank) precoders on a Physical Uplink Shared CHannel (PUSCH). In Release 15, a transmit scaling factor of the number of nonzero ports divided by the maximum number of configured SRS ports controlled the maximum transmit power.

In order to improve cell edge coverage, transmit modes were introduced to allow a UE to transmit full power (full amount of power for which the UE is rated) for the PUSCH with non-full rank, such as rank 1. In a transmission mode 1 (TM1) and a transmission mode 2 (TM2), a power amplifier on each transmit chain is rated for less power than the power rating of the UE. While providing the same functionality, TM1 and TM2 use different methodologies to support full power transmission. The UE may report the capability of the UE regarding which mode(s) the UE supports, and a network entity may configure the UE (e.g., by sending one or more instructions to the UE) to operate in a selected mode. The network may select the UE transmission mode through RRC (Radio Resource Control) signaling using the higher-layer parameter ULFPTxModes.

Transmission mode 1 supports full-power transmission by allowing non-coherent/partially-coherent UEs to use full-coherent precoders with a transparent S-CDD implementation. The implementation is transparent in that the UE does not inform the network of the delay shift introduced. The full-coherent precoders allow transmission of all of the ports using the same time and frequency resources. In TM1, the UE may be configured with one or two SRS resources with the same number of SRS ports within an SRS resource set and with a usage configuration parameter set to "codebook," with a codebook comprising a limited set of predefined beam-forming (precoder) vectors, with each precoder vector configured to attempt to transform a transmit symbol vector in such a way that the transmit symbol vector reaches the receiver in a desired way (e.g., with maximized receive power, maximized power over interference, maximized throughput/capacity, and/or a maximized outage metric).

Figure 7:
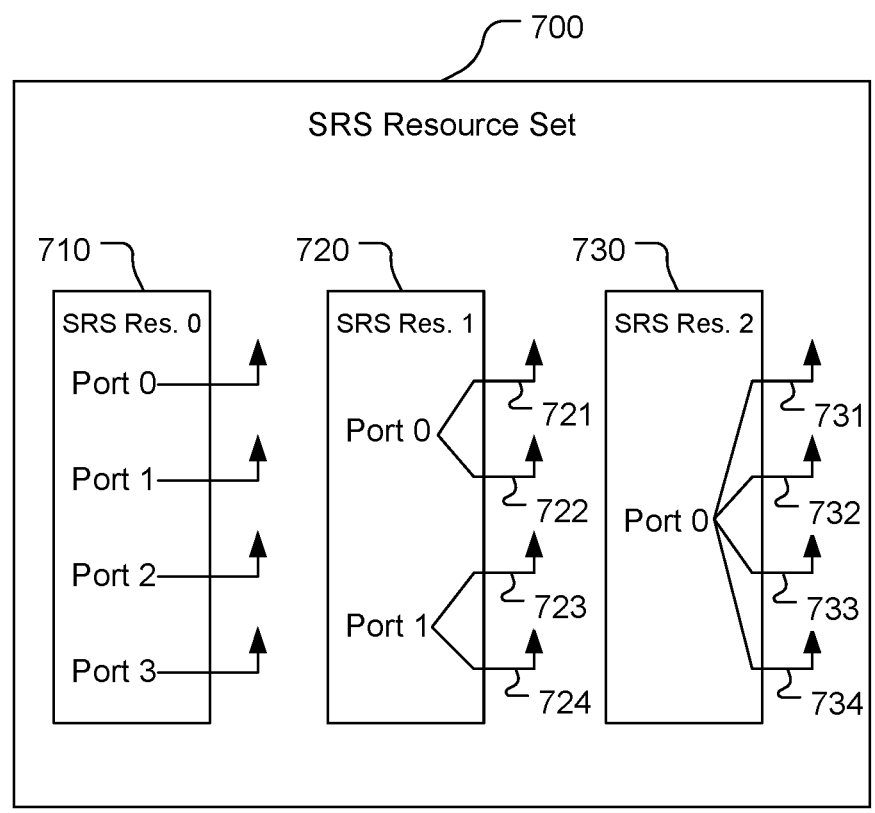
FIG. 7 is a block diagram of a resource set with three resources.

Transmission mode 2 supports full-power transmission and allows an SRS resource set (for codebook-based PUSCH) to contain up to four SRS resources that may have different numbers of SRS ports. Thus, the UE may be configured with one SRS resource or multiple SRS resources with the same number or different numbers of SRS ports within an SRS resource set and with the usage configuration parameter set to "codebook." Up to two different spatial relations may be configured for the SRS resources with the usage parameter set to "codebook." Up to four SRS resources may be supported for an SRS resource set with the usage parameter set to "codebook." Referring also to FIG. 7, an example of an SRS resource set 700 transmitted by a UE in TM2 includes three resources 710, 720, 730, each with a different number of ports. In this example, the SRS resource 710 includes four ports each mapped to a respective output that connects to a respective antenna (not shown), the SRS resource 720 includes two ports each mapped to a respective pair of outputs (and thus a respective pair of antennas), and the SRS resource 730 includes a single port mapped to all four of the outputs (and thus all four antennas). In transmission mode 2, virtualization/precoding of the ports may comprise performing CDD by, e.g., applying delay between the outputs from a common port. For example, the signal on an output 722 may be delayed with respect to the signal on an output 721 (or vice versa), and the signal on an output 724 may be delayed with respect to the signal on an output 723 (or vice versa). Similarly, the signals on outputs 731, 732, 733, 734 may have different delays. For example, the signal on the output 731 may have zero delay, the signal on the output 732 may be delayed by a shift delay D relative to the signal on the output 731, the signal on the output 732 may be delayed by twice the shift delay, 2D, relative to the signal on the output 731, and the signal on the output 733 may be delayed by three times the shift delay, 3D, relative to the signal on the output 731.

Delay Shift Reporting

If the same SRS resource is shared across multiple use cases (e.g., SRS for positioning, SRS for communication, codebook-based, non-codebook-based, antenna switching, channel estimation, etc.), then the precoding/antenna virtualization of each use case may be different. The antenna virtualization uses precoding to map a data stream to multiple physical antennas to form a virtual antenna (e.g., to form a radiation pattern that appears to originate from a single antenna). The precoding may select one or more ports and may apply one or more appropriate delay shifts. The delay shift may comprise a timing correction, timing offset, an/or cyclic-shift delay, e.g., a time delay (in the time domain) or a phase shift (in the frequency domain). Due to the precoding/antenna virtualization, one or more locations (in time) of peaks of received signals may be affected. Techniques are discussed herein for reporting delay shift information (e.g., timing correction/offset) of SRS resources due to the virtualization/precoding.

Figure 8:
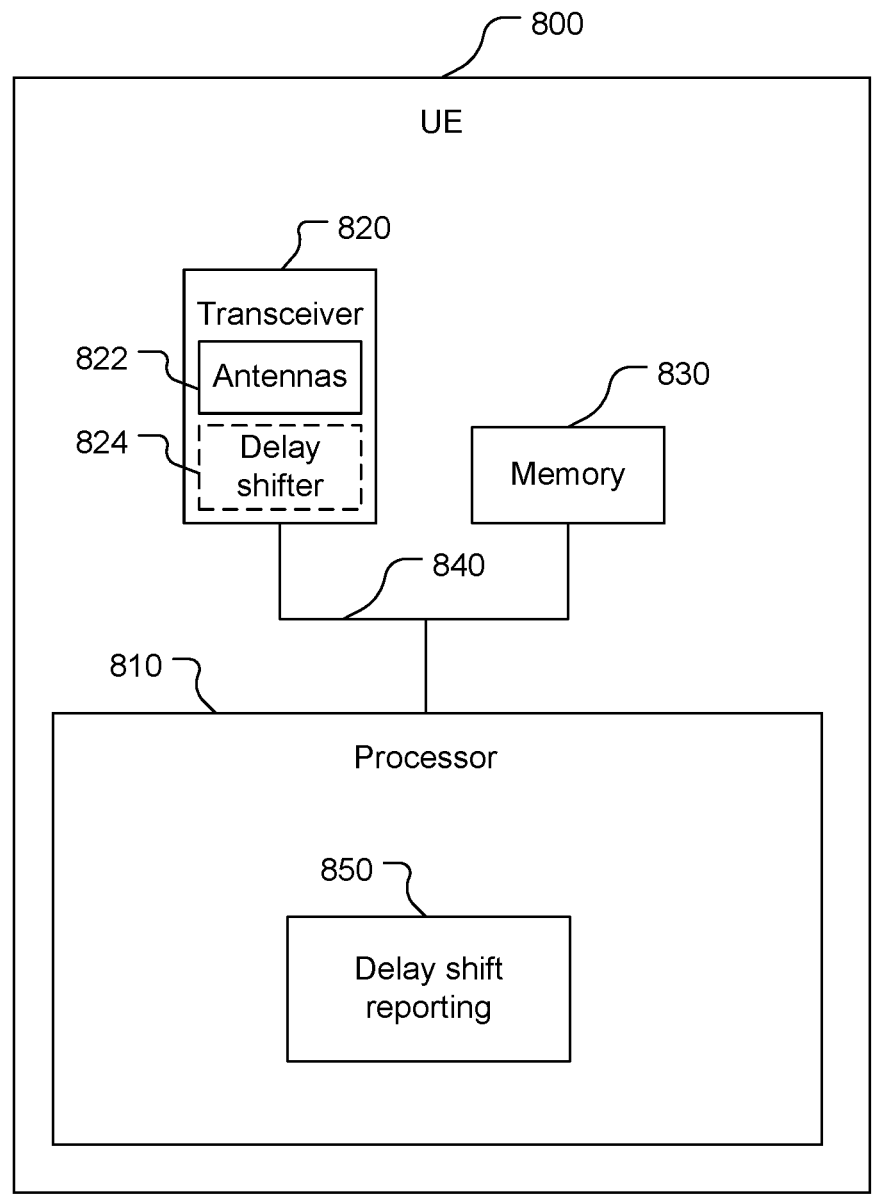
FIG. 8 is a block diagram of an example user equipment.

Referring to FIG. 8, with further reference to FIGS. 1-4, a UE 800 includes a processor 810, a transceiver 820, and a memory 830 communicatively coupled to each other by a bus 840. The UE 800 may include the components shown in FIG. 8, and may include one or more other components such as any of those shown in FIG. 2 such that the UE 200 may be an example of the UE 800. The transceiver 820 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. The antenna 246 includes multiple antennas. Also or alternatively, the transceiver 820 may include the wired transmitter 252 and/or the wired receiver 254. The transceiver 820 includes multiple antennas 822 (e.g., two antennas, four antennas) that may be realized by physically-separate antennas or portions of a single physical antenna, or a combination thereof. The transceiver 820 may include a delay shifter 824 that is configured to introduce a delay shift to each appropriate signal to be transmitted by a respective antenna of the antennas 822. The delay shifter 824 may be configured to apply a respective delay shift based on an instruction from the processor 810. The delay shifter 824 may be configured to apply delay shifts to signals for all of the antennas 822 to effect one or more desired delay shifts between the signals transmitted by the antennas 822. The memory 830 may be configured similarly to the memory 211, e.g., including software with processor-readable instructions configured to cause the processor 810 to perform functions. The description herein may refer only to the processor 810 performing a function, but this includes other implementations such as where the processor 810 executes software (stored in the memory 830) and/or firmware. The description herein may refer to the UE 800 performing a function as shorthand for one or more appropriate components (e.g., the processor 810 and the memory 830) of the UE 800 performing the function. The processor 810 (possibly in conjunction with the memory 830) includes a delay shift reporting unit 850 configured to report, via the transceiver 820, the delay shift(s) introduced (e.g., that will be introduced and/or that have been introduced) to one or more signals transmitted by the UE 800. The reported delay shift(s) may be used, for example, for RTOA (relative time of arrival) and Rx-Tx correction for positioning ($UE_{Rx-Tx}$ or $TRP_{Rx-Tx}$ (e.g., $gNB_{Rx-Tx}$)). The delay shift reporting unit 850 is discussed further below, and the description may refer to the processor 810 generally, or the UE 800 generally, as performing any of the functions of the delay shift reporting unit 850.

Figure 9:
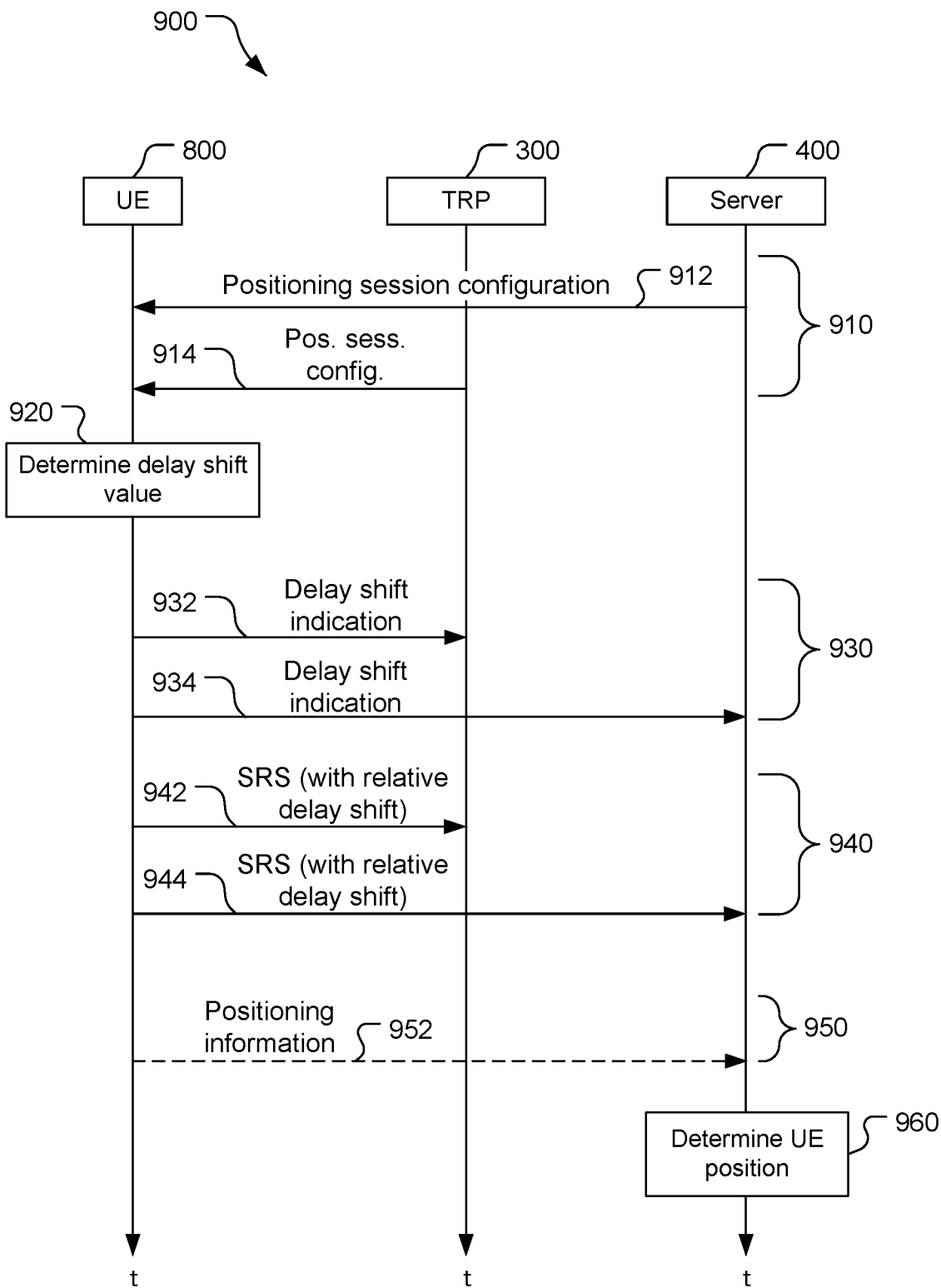
FIG. 9 is a signaling and process flow for reporting delay shift for signal transmission and for determining user equipment position.

Referring to FIG. 9, with further reference to FIGS. 2-4 and 8, a signaling and process flow 900 for reporting delay shift for signal transmission from the UE 800 and for determining UE position includes the stages shown. The flow 900, however, is an example only, as stages may be added, rearranged, and/or removed.

At stage 910, the UE 800 is configured for transmitting SRS (i.e., one or more SRS signals). For example, the server 400 sends a positioning session configuration message 912 to the UE 800 to configure the UE 800 to send SRS (e.g., an SRS resource/set for positioning and/or SRS for communication to be used for positioning as well) and any other positioning information. The message 912 may include the higher layer parameter ULFPTxModes that indicates to the UE 800 which transmission mode, e.g., TM1 or TM2, to use to send the SRS. Alternatively, the TRP 300 may send a positioning session configuration message 914 (using RRC signaling) to configure the UE 800 for sending the SRS and any other positioning information.

At stage 920, the UE 800 (e.g., the delay shift reporting unit 850) determines one or more delay shift amounts to be applied to one or more respective SRS resources or one or more SRS resource sets. The delay shift reporting unit 850 may determine the delay shift(s) in response to being configured to operate in transmission mode 1 or transmission mode 2, e.g., based on being configured to operate in TM1 or TM2. The delay shift reporting unit 850 may not immediately determine the delay shift(s) upon receipt of the configuration message 912 or 914 to operate in TM1 or TM2, but may use the configuration to operate in TM1 or TM2 as a condition for determining the delay shift(s). The delay shift reporting unit 850 may determine the delay shift(s) based on a sampling rate/SCS used for an associated SRS resource or SRS resource set. For example, the delay shift reporting unit 850 may be configured to determine the delay shift value as a multiple of a step size, where $$\text{step size} = T_c 2^k \quad (1)$$

$$T_c = \frac{1}{(\Delta f_{max} N_f)} \quad (2)$$

and where $\Delta f_{max}$ is a maximum subcarrier spacing, $N_f$ is a maximum fast Fourier transform size, and k is a constant based on the subcarrier spacing (SCS), with k having a value of 0, 1, 2, 3, 4, or 5 for SCS of 480, 240, 120, 60, 30, or 15 KHz, respectively. The step size provides a granularity or resolution to the delay shift that the UE 800 may implement. The delay shift reporting unit 850 may be configured to determine the delay shift(s) within a range of delay shift(s) that is based on a symbol length (and thus the SCS) or a cyclic prefix (CP) length. That is, the delay shift reporting unit 850 may be configured to determine the delay shift(s) with a minimum and a maximum delay shift based on the symbol length or the CP length. As three non-exhaustive examples, the delay shift reporting unit 850 may be configured to use half of the CP length, the CP length, or twice the CP length as the range of the possible delay shift(s). For example, the range of possible delay shift may be [0, CP/2], [−CP/2, CP/2], [0, CP], or [−CP, CP]. A delay shift, being a relative measure, may be negative to indicate that the corresponding signal is delayed less relative to another signal, e.g., not delayed while another signal is delayed some positive amount.

At stage 930, the UE 800 sends a delay shift indication to a network entity, e.g., to the TRP 300 and/or to the server 400. For example, the delay shift reporting unit 850 may send a delay shift indication message 932 to the TRP 300 and/or may send a delay shift indication message 934 to the server 400. The delay shift reporting unit 850 may report the delay shift(s) (also called timing correction(s), timing offset(s), and/or cyclic-shift delay(s)) in response to being configured to operate in transmission mode 1 or transmission mode 2, e.g., based on being configured to operate in TM1 or TM2. The delay shift reporting unit 850 may not immediately report the delay shift(s) upon receipt of the configuration message 912 or 914 to operate in TM1 or TM2, but may use the configuration to operate in TM1 or TM2 as a condition for reporting the delay shift(s). The delay shift indication may be, for example, indicated as a time shift or a phase offset. The UE 800 may send the delay shift indication based on the UE 800 being informed that a receiving entity will use the SRS to determine UE position, or may send the delay shift indication regardless of expected use of the SRS.

The delay shift indication may or may not include a value of the delay shift applied by the UE 800. The delay shift indication may indicate that a delay shift has been or will be applied by the UE 800 without specifying how much delay shift has been or will be applied. A receiver of the delay shift indication may use the information that a non-specific delay shift has been applied to process received signals, e.g., determining that a difference in received signals (e.g., timing of the received signals) is due to a delay shift rather than multi-path transmission. The receiver of the delay shift indication may be able to determine the amount of the delay shift based on the received signals. The delay shift reporting unit 850 may be configured to indicate, in the delay shift indication message(s) 932, 934, the amount of (i.e., a value of) the delay shift applied (e.g., to be applied) by the UE 800. For example, the delay shift may be a phase offset applied to each successive subcarrier such that a second subcarrier is offset by a phase offset relative to a first subcarrier, a third subcarrier is offset by the phase offset relative to the second subcarrier, etc. This linear increase in phase offset relative to the first subcarrier provides a phase ramp of phase offsets to the respective subcarriers.

The value of the delay shift may be indicated by bits representing a number that is a multiplier of a step size, e.g., as determined in accordance with Equations (1) and (2). Thus, the delay shift value is the step size multiplied by the number corresponding to the set of binary bits. The indicated value of the delay shift may not correspond exactly to the applied delay shift, e.g., if the possible reporting values based on the reporting resolution (e.g., based on the available bits and the range of reportable delay shifts) are different from the possible delay shift values.

The delay shift indication message(s) 932, 934 may be reported by the UE 800 in a variety of ways and/or as part of a variety of communications. For example, the delay shift reporting unit 850 may send the delay shift indication message 932 to the TRP 300 using RRC signal and may send the delay shift indication message 934 to the server 400 (e.g., an LMF) using high-layer LPP (Long Term Evolution Positioning Protocol) signaling. Either of the delay shift indication messages 932, 934 may be part of a UL MAC-CE (Uplink Medium Access Control—Control Element) command with a delay shift value reported for each SRS resource or SRS resource set. Either of the delay shift indication messages 932, 934 may include a timestamp, e.g., a Sequence Frame Number (SFN) and slot offset. As another example, either of the delay shift indication messages 932, 934 may be part of a positioning report, either in a high-layer communication, or a MAC-CE command, or a UCI (uplink control information) communication.

The delay shift indication message(s) 932, 934 may be repeatedly reported. The UE 800 may send the message(s) 932, 934 intermittently, e.g., periodically. The UE 800 may send the message(s) 932, 934 in response to the delay shift changing. A change in the delay shift may correspond to one SRS or multiple SRS, e.g., all SRS until a new delay shift indication message is sent by the UE 800 and received by a network entity such as the TRP 300 or the server 400.

At stage 940, the UE 800 sends SRS signals with different relative delay shifts. For example, the UE 800 may send an SRS message 942 to the TRP 300 and/or an SRS message 944 to the server 400. The SRS message 942 and the SRS message 942 each includes multiple signal transmissions. In each of the SRS message 942 or the SRS message 944, SRS signals are sent by the UE 800 with one or more relative delay shifts. For example, the same SRS signal (same content and resources) may be sent via the antennas 822 with different delays (e.g., via one of the antennas 822 with no delay and via another one of the antennas 822 with some delay, or via one of the antennas 822 with no delay and via three other of the antennas 822 each with different delays, or via multiple (e.g., two or four) of the antennas 822 each with a different delay). The applied delay shift may be unknown to the receiver of the SRS. If the SRS resource set in the SRS message 944 includes multiple SRS resources, and the UE 800 reported that at least some (one or more) of the resources have delay shift applied, then the receiver (e.g., the TRP 300 or the server 400) may assume that at least one of the SRS resources does not have delay shift applied. For example, the receiver (e.g., the TRP 300 or the server 400) of the SRS may assume that no delay shift is applied to any resource where ports are mapped one-to-one to antennas. For example, in transmission mode 2 a resource set may have two resources, with one resource having two ports and the other resource having a single port. If the UE 800 reports that this resource set (or one of the resources) has an unknown delay shift applied, then the receiver (e.g., the server 400 or the TRP 300) may use the earlier-received resource to identify a time of arrival and may use a difference in arrival times to estimate the applied delay shift between the two resources.

At stage 950, the UE 800 may send positioning information to the server 400. The UE 800 may send positioning information other than the SRS to the server 400 in a positioning information message 952. The UE 800 may send the positioning information message 952 to the server 400 via the TRP 300. The positioning information message 952 may include measurement information, timing information (e.g., time of arrival of a DL PRS, $UE_{Rx-Tx}$), etc. that may be useful to the server 400 in determining location of the UE 800.

At stage 960, the server 400 may determine UE position. The server 400 may use measurements of the SRS from stage 940 and may use other positioning information (depending on the positioning technique and availability of the information) received in the message 952 to determine the location of the UE 800. The server 400 may use the delay shift indication received at stage 930 to help determine the location of the UE 800. The receiver of the delay shift indication and the SRS signal(s) to which the delay shift(s) is(are) applied, e.g., the server 400, may use the delay shift value to process the received signals. Knowing that a delay shift is applied, and possibly how much delay shift, e.g., from the delay shift indication message(s) 932, 934, the receiver (e.g., the server 400) may be able to mitigate negative effects (e.g., fading) on position determination due to the multiple SRS signal transmission while allowing signal decoding benefits of transmit diversity due to the multiple SRS signal transmission.

Operation

Figure 10:
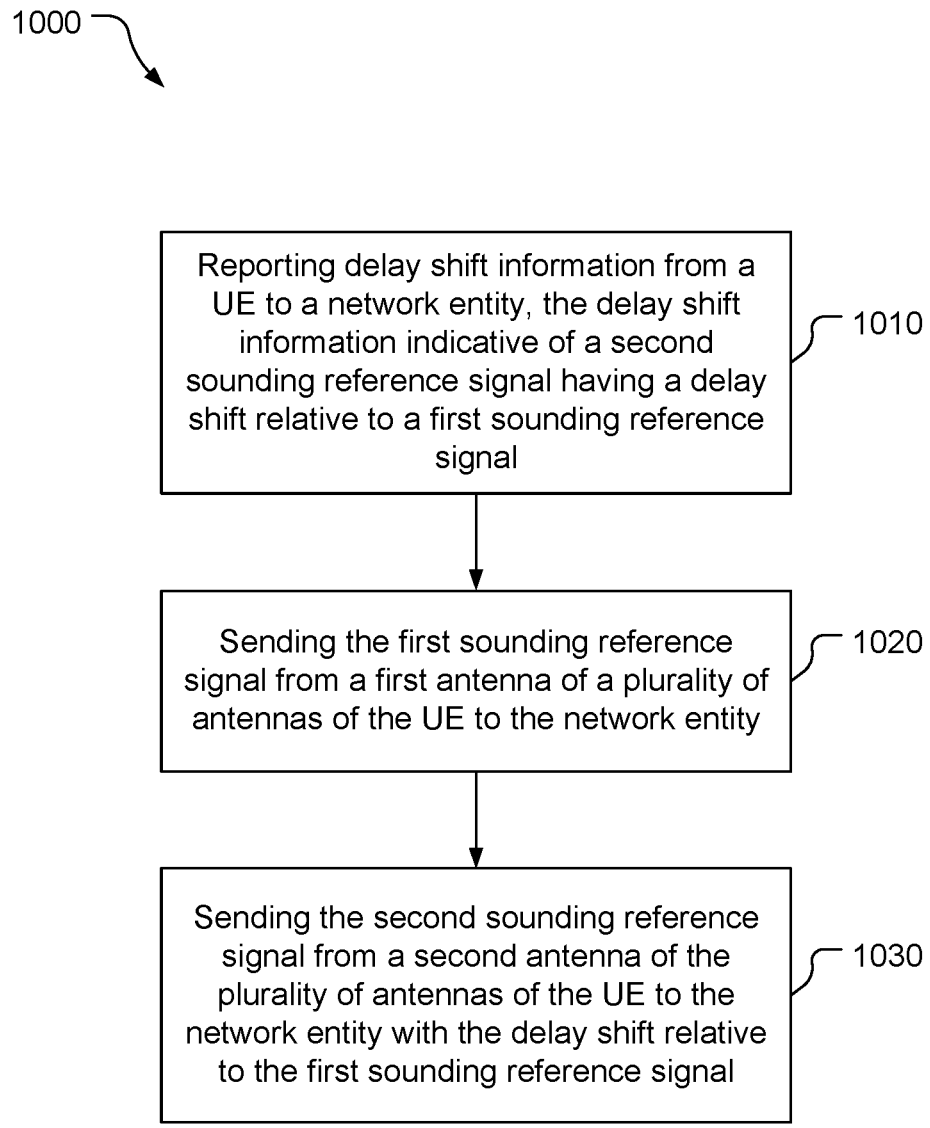
FIG. 10 is a block flow diagram of a method of sending sounding reference signals.

Referring to FIG. 10, with further reference to FIGS. 1-9, a method 1000 of sending sounding reference signals includes the stages shown. The method 1000 is, however, an example only and not limiting. The method 1000 may be altered, e.g., by having stages added, removed, rearranged, combined, performed concurrently, and/or having single stages split into multiple stages. For example, stage 1010 may be performed before or after stage 1020 or stage 1030.

At stage 1010, the method 1000 includes reporting delay shift information from a UE to a network entity, the delay shift information indicative of a second sounding reference signal having a delay shift relative to a first sounding reference signal. For example, the delay shift reporting unit 850 may send the delay shift information in the delay shift indication message 932 to the TRP 300 (e.g., using RRC signaling) and/or in the delay shift indication message 934 to the server 400 (e.g., using LPP signaling). The delay shift information may be reported in a MAC-CE command and/or in a positioning report. For example, the delay shift information may be reported in the MAC-CE command and may include a delay shift value for a sounding reference signal resource set or a sounding reference signal resource. The delay shift information may include an indication that a delay shift is or will be applied to at least one of the sounding reference signals. The delay shift information may be a notice that delay shift will exist, but an amount of the delay shift may be unspecified (e.g., the delay shift information may indicate that the second sounding reference signal has an unspecified, non-zero delay shift relative to the first sounding reference signal). The delay shift information may include a delay shift value indicating an amount of the delay shift of the second sounding reference signal relative to the first sounding reference signal. The delay shift value may indicate a maximum delay shift of the second sounding reference signal relative to the first sounding reference signal (e.g., a maximum delay shift that may be applied between two sounding reference signals). The delay shift value may not correspond exactly to the delay shift of the second sounding reference signal relative to the first sounding reference signal. Reporting of the delay shift may be performed before or after sending the first sounding reference signal and/or sending the second sounding reference signal. The processor 810, the memory 830, and the transceiver 820 may comprise means for reporting delay shift information.

At stage 1020, the method 1000 includes sending the first sounding reference signal from a first antenna of a plurality of antennas of the user equipment to the network entity. For example, the UE 800 may transmit the first SRS via one antenna of the antennas 822. The UE 800 may send the first SRS with or without a delay shift. The processor 810, the memory 830, and one of the antennas of the transceiver 820 may comprise means for sending the first SRS to the network entity.

At stage 1030, the method 1000 includes sending the second sounding reference signal from a second antenna of a plurality of antennas of the user equipment to the network entity with the delay shift relative to the first sounding reference signal. For example, the UE 800 may transmit the second SRS via a different antenna of the antennas 822 than was used to transmit the first SRS. The UE 800 sends the second SRS with a delay shift relative to the first SRS (whether the first SRS had a delay shift applied or not). The delay shift may be realized by the processor 810 sending the respective signals to the transceiver 820 at different times, and/or by the delay shifter 824 introducing one or more delay shifts to realize the relative delay shift between the first and second sounding reference signals. The processor 810, the memory 830, and one of the antennas of the transceiver 820 may comprise means for sending the second SRS to the network entity.

Implementations of the method 1000 may include one or more of the following features. In an example implementation, the method 1000 may include determining the delay shift value based on a subcarrier spacing of the first sounding reference signal and the second sounding reference signal. The processor 810 and the memory 830 may comprise means for determining the delay shift value. In another example implementation, the delay shift reporting unit 850 may determine the delay shift value as a multiple of a step size, and may determine the step size in accordance with Equations (1) and (2). In another example implementation, the method 1000 may include receiving, at the UE, a configuration message instructing the UE to operate in a codebook-based, full-power transmission mode, where the delay shift information is reported in response to receiving the configuration message. For example, the UE 800 may receive an instruction in the positioning session configuration message 912 to operate in TM1 or TM2. The delay shift reporting unit 850 may report (or even determine) the delay shift in response to receiving the message 912, e.g., as a condition for reporting the delay shift.

Also or alternatively, implementations of the method 1000 may include one or more of the following features. In an example implementation, the first and second sounding reference signals may be sent such that the delay shift is no larger than a duration of a first cyclic prefix of the first sounding reference signal or a second cyclic prefix of the second sounding reference signal. For example, the processor 810 may send the first and second SRS via the transceiver 820 with a delay shift applied to one or both of the SRS such that the relative delay shift between the first and second SRS is less than or equal to the length of the CP of the first SRS or the length of the CP of the second SRS. The length (in time) of the CP of the first SRS and the length of the CP of the second SRS may be the same length. In another example implementation, the first sounding reference signal and the second sounding reference signal may have the same content. The processor 810 may send the same SRS to multiple (e.g., two or four) antennas but with different delay shifts (with correspondingly different CP contents). In another example implementation, the delay shift information comprises a timing correction, a timing offset, a cyclic-shift delay, or any combination thereof, and the first sounding reference signal and the second sounding reference signal are both a sounding reference signal resource for positioning, a sounding reference signal resource set for positioning, or a sounding reference signal for communication. For example, the second sounding reference signal is the first sounding reference with a delay shift, and the sounding reference signals may comprise an SRS resource for positioning, an SRS resource set for positioning, or an SRS for communication that may also be used for positioning.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment configured for wireless communication, the user equipment comprising:
   a transceiver including a plurality of antennas;
   a memory; and
   a processor communicatively coupled to the transceiver and the memory and configured to:
      send, to a network entity, a first sounding reference signal via a first antenna of the plurality of antennas;
      send, to the network entity, a second sounding reference signal via a second antenna of the plurality of antennas, with the second sounding reference signal having a delay shift relative to the first sounding reference signal; and
      send, via the transceiver to the network entity, delay shift information indicative of the second sounding reference signal having the delay shift relative to the first sounding reference signal, wherein to send the delay shift information the processor is configured to send a delay shift value indicating an amount of the delay shift of the second sounding reference signal relative to the first sounding reference signal, and wherein the delay shift value indicates a maximum delay shift of the second sounding reference signal relative to the first sounding reference signal.

2. The user equipment of claim 1, wherein the delay shift information indicates that the second sounding reference signal has a non-zero delay shift relative to the first sounding reference signal.

3. The user equipment of claim 1, wherein the processor is further configured to determine the delay shift value based on a subcarrier spacing of the first sounding reference signal and the second sounding reference signal.

4. The user equipment of claim 1, wherein the processor is further configured to determine the delay shift value as a multiple of a step size, wherein:

$$\text{step size} = T_c 2^k; T_c = \frac{1}{(\Delta f_{max} N_f)};$$

and
$\Delta f_{max}$ is a maximum subcarrier spacing, $N_f$ is a maximum fast Fourier transform size, and k is a constant based on the subcarrier spacing.

5. The user equipment of claim 1, wherein the processor is further configured to send the delay shift information in response to receiving a configuration message, via the transceiver, instructing the user equipment to operate in a codebook-based, full-power transmission mode.

6. The user equipment of claim 1, wherein the processor is further configured to send the delay shift information at least one of to a server using LPP (Long Term Evolution Positioning Protocol) signaling or to a base station using RRC (Radio Resource Control) signaling.

7. The user equipment of claim 1, wherein the processor is further configured to send the delay shift information in at least one of a MAC-CE (medium access control-control element) command or in a positioning report.

8. The user equipment of claim 7, wherein the processor is further configured to send the delay shift information in the MAC-CE command, and wherein the delay shift information includes a delay shift value for a sounding reference signal resource set or a sounding reference signal resource.

9. The user equipment of claim 1, wherein the processor is configured to send the first sounding reference signal and the second sounding reference signal with the delay shift being no larger than a duration of a first cyclic prefix of the first sounding reference signal or a second cyclic prefix of the second sounding reference signal.

10. The user equipment of claim 1, wherein the first sounding reference signal and the second sounding reference signal have the same content.

11. The user equipment of claim 1, wherein the delay shift information comprises a timing correction, a timing offset, a cyclic-shift delay, or any combination thereof, and the first sounding reference signal and the second sounding reference signal are both a sounding reference signal resource for positioning, a sounding reference signal resource set for positioning, or a sounding reference signal for communication.

12. A user equipment comprising:
   means for sending a first sounding reference signal via a first antenna of the plurality of antennas to a network entity;
   means for sending a second sounding reference signal via a second antenna of the plurality of antennas to the network entity with a delay shift relative to the first sounding reference signal; and
   means for reporting delay shift information to the network entity, the delay shift information being indicative of the second sounding reference signal having the delay shift relative to the first sounding reference signal, wherein the means for reporting the delay shift information comprises means for reporting a delay shift value indicating an amount of the delay shift of the second sounding reference signal relative to the first sounding reference signal, wherein the delay shift value indicates a maximum delay shift of the second sounding reference signal relative to the first sounding reference signal.

13. The user equipment of claim 12, wherein the delay shift information indicates that the second sounding reference signal has a non-zero delay shift relative to the first sounding reference signal.

14. The user equipment of claim 12, further comprising means for determining the delay shift value based on a subcarrier spacing of the first sounding reference signal and the second sounding reference signal.

15. The user equipment of claim 12, further comprising means for determining the delay shift value as a multiple of a step size, wherein:

$$\text{step size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

16. The user equipment of claim 12, wherein the means for reporting the delay shift information comprise means for reporting the delay shift information in response to receiving a configuration message instructing the user equipment to operate in a codebook-based, full-power transmission mode.

17. The user equipment of claim 12, wherein the means for reporting the delay shift information comprise means for reporting the delay shift information at least one of to a server using LPP (Long Term Evolution Positioning Protocol) signaling or to a base station using RRC (Radio Resource Control) signaling.

18. The user equipment of claim 12, wherein the means for reporting the delay shift information comprise means for reporting the delay shift information in at least one of a MAC-CE (medium access control-control element) command or in a positioning report.

19. The user equipment of claim 18, wherein the means for reporting the delay shift information comprise means for reporting the delay shift information in the MAC-CE command, and wherein the delay shift information includes a delay shift value for a sounding reference signal resource set or a sounding reference signal resource.

20. The user equipment of claim 12, wherein the means for sending the first sounding reference signal and the means for sending the second sounding reference signal comprise means for sending the first sounding reference signal and the second sounding reference signal such that the delay shift is no larger than a duration of a first cyclic prefix of the first sounding reference signal or a second cyclic prefix of the second sounding reference signal.

21. The user equipment of claim 12, wherein the first sounding reference signal and the second sounding reference signal have the same content.

22. A method of sending sounding reference signals, the method comprising:
reporting delay shift information from a user equipment to a network entity, the delay shift information indicative of a second sounding reference signal having a delay shift relative to a first sounding reference signal;
sending the first sounding reference signal from a first antenna of a plurality of antennas of the user equipment to the network entity; and
sending the second sounding reference signal from a second antenna of the plurality of antennas of the user equipment to the network entity with the delay shift relative to the first sounding reference signal, wherein reporting the delay shift information comprises reporting a delay shift value indicating an amount of the delay shift of the second sounding reference signal relative to the first sounding reference signal, and wherein the delay shift value indicates a maximum delay shift of the second sounding reference signal relative to the first sounding reference signal.

23. The method of claim 22, wherein the delay shift information indicates that the second sounding reference signal has a non-zero delay shift relative to the first sounding reference signal.

24. The method of claim 22, further comprising determining the delay shift value based on a subcarrier spacing of the first sounding reference signal and the second sounding reference signal.

25. The method of claim 22, further comprising determining the delay shift value as a multiple of a step size, wherein:

$$\text{step size} = T_c 2^k; T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

26. The method of claim 22, further comprising receiving, at the user equipment, a configuration message instructing the user equipment to operate in a codebook-based, full-power transmission mode, wherein the delay shift information is reported in response to receiving the configuration message.

27. The method of claim 22, wherein the delay shift information is reported to at least one of a server using LPP (Long Term Evolution Positioning Protocol) signaling or a base station using RRC (Radio Resource Control) signaling.

28. The method of claim 22, wherein the delay shift information is reported in at least one of a MAC-CE (medium access control-control element) command or in a positioning report.

29. The method of claim 28, wherein the delay shift information is reported in the MAC-CE command, and wherein the delay shift information includes a delay shift value for a sounding reference signal resource set or a sounding reference signal resource.

30. The method of claim 22, wherein the first sounding reference signal and the second sounding reference signal are sent such that the delay shift is no larger than a duration of a first cyclic prefix of the first sounding reference signal or a second cyclic prefix of the second sounding reference signal.

31. The method of claim 22, wherein the first sounding reference signal and the second sounding reference signal have the same content.

32. The method of claim 22, wherein the delay shift information comprises a timing correction, a timing offset, a cyclic-shift delay, or any combination thereof, and the first sounding reference signal and the second sounding reference signal are both a sounding reference signal resource for positioning, a sounding reference signal resource set for positioning, or a sounding reference signal for communication.

33. A non-transitory, processor-readable storage medium comprising processor-readable instructions to cause a processor of a user equipment to:
send, to a network entity, a first sounding reference signal via a first antenna of a plurality of antennas of the user equipment;
send, to the network entity, a second sounding reference signal via a second antenna of the plurality of antennas of the user equipment, with the second sounding reference signal having a delay shift relative to the first sounding reference signal; and
send, to the network entity, delay shift information indicative of the second sounding reference signal having the delay shift relative to the first sounding reference signal, wherein the processor-readable instructions to cause the processor to send the delay shift information comprise processor-readable instructions to cause the processor to send a delay shift value indicating an amount of the delay shift of the second sounding reference signal relative to the first sounding reference signal, and wherein the delay shift value indicates a maximum delay shift of the second sounding reference signal relative to the first sounding reference signal.

34. The storage medium of claim 33, wherein the delay shift information indicates that the second sounding reference signal has a non-zero delay shift relative to the first sounding reference signal.

35. The storage medium of claim 33, further comprising processor-readable instructions to cause the processor to determine the delay shift value based on a subcarrier spacing of the first sounding reference signal and the second sounding reference signal.

36. The storage medium of claim 33, further comprising processor-readable instructions to cause the processor to determine the delay shift value as a multiple of a step size, wherein:

$$\text{step size} = T_c 2^k;$$

$$T_c = \frac{1}{(\Delta f_{max} N_f)};$$

and $\Delta f_{max}$ is a maximum subcarrier spacing, $N_f$ is a maximum fast Fourier transform size, and k is a constant based on the subcarrier spacing.

37. The storage medium of claim 33, wherein the processor-readable instructions to cause the processor to send the delay shift information comprise processor-readable instructions to cause the processor to send the delay shift information in response to the user equipment receiving a configuration message instructing the user equipment to operate in a codebook-based, full-power transmission mode.

38. The storage medium of claim 33, wherein the processor-readable instructions to cause the processor to send the delay shift information comprise processor-readable instructions to cause the processor to send the delay shift information at least one of to a server using LPP (Long Term Evolution Positioning Protocol) signaling or to a base station using RRC (Radio Resource Control) signaling.

39. The storage medium of claim 33, wherein the processor-readable instructions to cause the processor to send the delay shift information comprise processor-readable instructions to cause the processor to send the delay shift information in at least one of a MAC-CE (medium access control-control element) command or in a positioning report.

40. The storage medium of claim 39, wherein the processor-readable instructions to cause the processor to send the delay shift information comprise processor-readable instructions to cause the processor to send the delay shift information in the MAC-CE command, and wherein the delay shift information includes a delay shift value for a sounding reference signal resource set or a sounding reference signal resource.

41. The storage medium of claim 33, wherein the processor-readable instructions to cause the processor to send the first sounding reference signal and the second sounding reference signal comprise processor-readable instructions to cause the processor to send the first sounding reference signal and the second sounding reference signal with the delay shift being no larger than a duration of a first cyclic prefix of the first sounding reference signal or a second cyclic prefix of the second sounding reference signal.

42. The storage medium of claim 33, wherein the processor-readable instructions to cause the processor to send the first sounding reference signal and the second sounding reference signal comprise processor-readable instructions to cause the processor to send the first sounding reference signal and the second sounding reference signal with the same content.

* * * * *